No. 801,197. PATENTED OCT. 3, 1905.
R. METIVIE.
BAIN MARIE.
APPLICATION FILED JAN. 28, 1905.
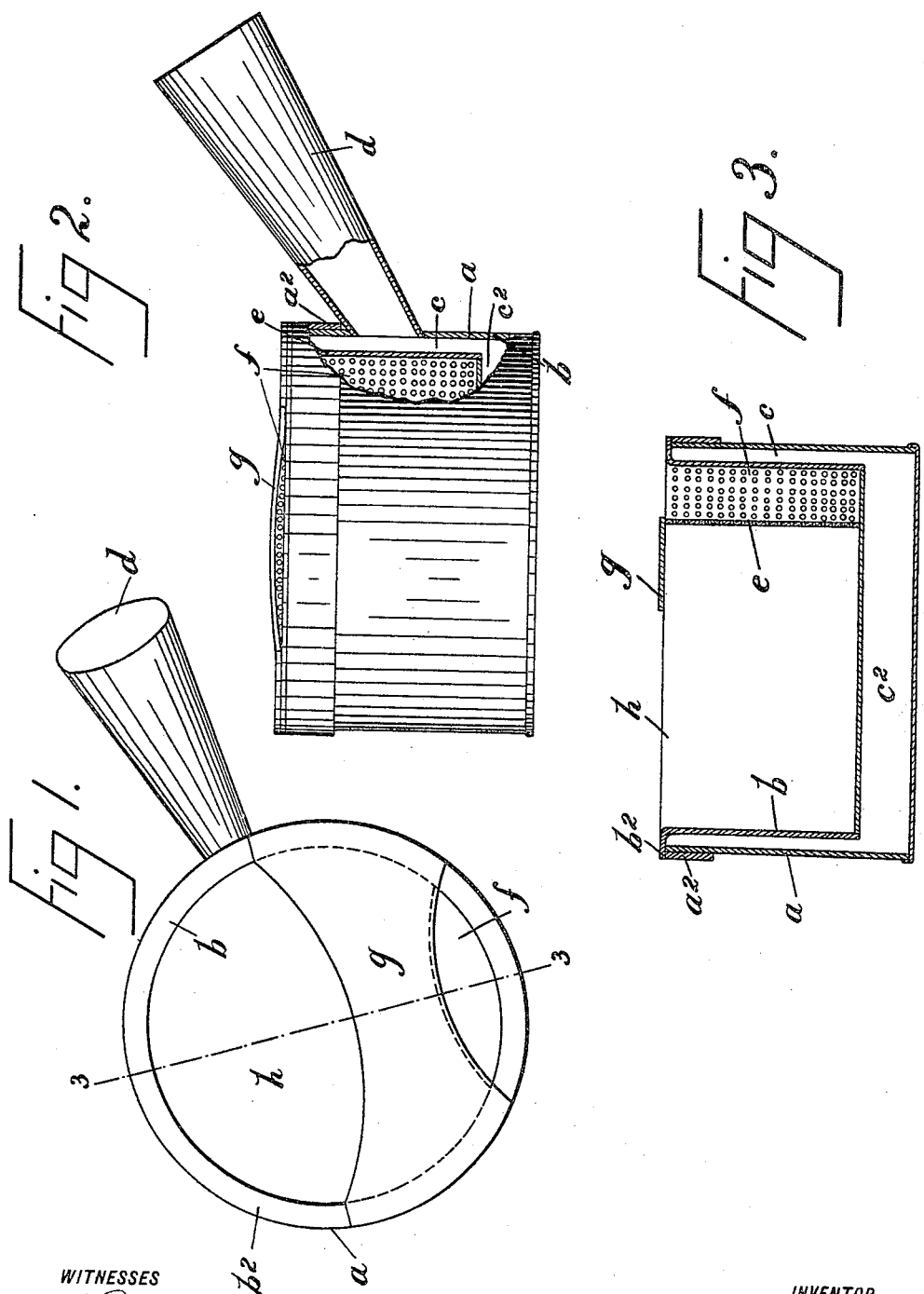
WITNESSES
M. Rader
J. C. Larsen
INVENTOR
René Metivie
BY Edgar Tate & Co.
ATTORNEYS

UNITED STATES PATENT OFFICE.

RENÉ METIVIE, OF NEW YORK, N. Y.

BAIN-MARIE.

No. 801,197.

Specification of Letters Patent.

Patented Oct. 3, 1905.

Original application filed May 4, 1904, Serial No. 207,058. Divided and this application filed January 28, 1905. Serial No. 243,018.

*To all whom it may concern:*

Be it known that I, RENÉ METIVIE, a citizen of the United States, residing at New York, in the county of New York and State of New York, have invented certain new and useful Improvements in Bain-Maries, of which the following is a specification, such as will enable those skilled in the art to which it appertains to make and use the same.

This invention relates to bain-maries for use in connection with presses for expressing the juices from ducks and other fowls and other meats; and the object thereof is to provide an improved device of this class which is simple in construction and operation and comparatively inexpensive; and with this and other objects in view the invention consists in a bain-marie constructed as hereinafter described and claimed.

This application is a division of another application for Letters Patent of the United States filed by me May 4, 1904, Serial No. 207,058, and the invention which forms the basis of this application is fully disclosed in the following specification, of which the accompanying drawings form a part, in which the separate parts of my improvement are designated by suitable reference characters in each of the views, and in which—

Figure 1 is a plan view of my improved bain-marie; Fig. 2, a view thereof with part of the construction broken away; Fig. 3, a cross-section on the line 3 3 of Fig. 1.

In the practice of my invention I provide a receptacle $a$, which is open at the top and which in the form of construction shown is circular in cross-section, and placed concentrically in the receptacle $a$ is a supplemental receptacle $b$, which is of less dimensions than the receptacle $a$, and around the supplemental receptacle $b$ is an annular space or chamber $c$, which is in communication with a chamber $c^2$ in the bottom of the receptacle $a$ or between the bottom of the said receptacle $a$ and the supplemental receptacle $b$.

In the form of construction shown the receptacle $b$ is also open at the top and provided with an annular flange or rim $b^2$, which rests on the receptacle $a$, and said receptacle $a$ is provided with a band $a^2$ around the top thereof which gives strength thereto, and said receptacles $a$ and $b$ may be secured together at the top in any desired manner.

At one side of the receptacle $a$ is a funnel-shaped handle $d$, which communicates with the annular space or chamber $c$ and through said annular space or chamber $c$ with the bottom chamber $c^2$ in the receptacle $a$, and within and at one side of the supplemental receptacle $b$ is secured a vertically-arranged strainer $e$, which is convex in cross-section and which incloses a vertical space $f$ between said strainer and the adjacent wall of the receptacle $a$, and in the form of construction shown a transverse plate $g$ is secured to the top of the receptacle $f$, one edge of which is flush with or rests on the strainer $e$.

Both edges of the transverse plate $g$ are preferably formed concave, as shown in Fig. 1, and this forms an opening $h$, which communicates with the supplemental receptacle $b$, and in practice this device is placed under a press of the character hereinbefore referred to, and the fowl or other meat from which the juice is to be compressed is placed in said press and the juice flows therefrom into the bain-marie or into the receptacle $b$.

In practice the spaces or chamber $c$ and $c^2$ are filled with water, preferably hot water, through the funnel-shaped handle $d$, and the meat-juice in the receptacle $b$ will be warmed thereby, or the said juice may be cooked or boiled by setting the bain-marie on a stove or other heater by which the water in the spaces or chambers $c$ and $c^2$ may be heated to any desired extent, or this device may be used in the manner of other devices of this class, and when desired the juice in the receptacle $b$ may be poured out through the opening $f$, and in this operation the said juice will be strained in passing through the strainer $e$.

Having fully described my invention, what I claim as new, and desire to secure by Letters Patent, is—

1. A device of the class described, comprising a main outer receptacle, a supplemental inner receptacle placed within the main outer receptacle and suspended from the top thereof, and between which and the main outer receptacle is an annular space or chamber which communicates with another space or chamber beneath the supplemental receptacle, the annular space or chamber being closed at the top, and the main outer receptacle being provided with a hollow handle which communicates with one of said spaces or chambers, said supplemental receptacle being also provided at one side thereof with a strainer, substantially as shown and described.

2. A device of the class described, comprising a main outer receptacle, a supplemental inner receptacle placed within the main outer receptacle and suspended from the top thereof, and between which and the main outer receptacle is an annular space or chamber which communicates with another space or chamber beneath the supplemental receptacle, the annular space or chamber being closed at the top, and the main outer receptacle being provided with a hollow handle which communicates with one of said spaces or chambers, said supplemental receptacle being also provided at one side thereof with a strainer which communicates with a space which opens through the top of the supplemental receptacle, substantially as shown and described.

3. A device of the class described, comprising a main outer receptacle, a supplemental inner receptacle placed within the main outer receptacle and suspended from the top thereof, and between which and the main outer receptacle is an annular space or chamber which communicates with another space or chamber beneath the supplemental receptacle, the annular space or chamber being closed at the top, and the main outer receptacle being provided with a hollow handle which communicates with one of said spaces or chambers, said supplemental receptacle being also provided at one side thereof with a strainer which communicates with a space which opens through the top of the supplemental receptacle, the top of said supplemental receptacle being also open at the opposite side thereof, substantially as shown and described.

In testimony that I claim the foregoing as my invention I have signed my name, in presence of the subscribing witnesses, this 26th day of January, 1905.

RENÉ METIVIE.

Witnesses:
F. A. STEWART,
C. E. MULREANY.